United States Patent
Al-Salem et al.

(10) Patent No.: US 8,665,342 B2
(45) Date of Patent: Mar. 4, 2014

(54) MODEL-INDEPENDENT GENERATION OF AN ENHANCED RESOLUTION IMAGE FROM A NUMBER OF LOW RESOLUTION IMAGES

(75) Inventors: Faisal Muhammed Al-Salem, Riyadh (SA); Andrew Emil Yagle, Ann Arbor, MI (US)

(73) Assignee: King Abddulaziz City for Science and Technology, Riyadh (SA)

( * ) Notice: Subject to any disclaimer, the term of this patent is extended or adjusted under 35 U.S.C. 154(b) by 297 days.

(21) Appl. No.: 13/039,336

(22) Filed: Mar. 3, 2011

(65) Prior Publication Data

US 2012/0224085 A1    Sep. 6, 2012

(51) Int. Cl.
*H04N 5/228*    (2006.01)

(52) U.S. Cl.
USPC ........................................ 348/222.1; 348/239

(58) Field of Classification Search
USPC ................ 348/222.1, 239; 382/262, 275, 284
See application file for complete search history.

(56) References Cited

U.S. PATENT DOCUMENTS

| | | | |
|---|---|---|---|
| 7,245,250 B1 * | 7/2007 | Kalayeh ...................... 342/25 R |
| 2004/0243656 A1 * | 12/2004 | Sung et al. .................... 708/404 |

OTHER PUBLICATIONS

Title—"Blind Super-Resolution From Multiple Undersampled Images Using Sampling Diversity" by Faisal M. Ai-Salem; Date 2010; pp. 115; (Last Visited: Jun. 7, 2011).
Title—"Non-Parametric Multiframe Super-Resolution Using Sampling Rate Diversity" by Faisal M. Al-Salem and Andrew E. Yagle; Date: Jun. 23, 2010; pp. 41; (Last Visited: Jun. 7, 2011).
Title—"Fast Model-Free Super-Resolution Using a Two-Sensor Camera" by Faisal M. Al-Salem, Andrew E. Yagle; Date: Oct. 24, 2010;pp. 17; (Last Visited: Jun. 14, 2011).

* cited by examiner

*Primary Examiner* — Yogesh Aggarwal
(74) *Attorney, Agent, or Firm* — Raj Abhyanker, P.C.

(57) ABSTRACT

A method, an apparatus and/or a system of model-independent generation of an enhanced resolution of image from a number of low resolution images is disclosed. A method includes capturing a number of low resolution images through a first sensor (e.g., first plurality of low resolution images) and a number of low resolution images through a second sensor (e.g., second plurality of low resolution images). The first sensor has a higher resolution than the second sensor. The method also includes estimating expansion coefficients of polyphase components of an enhanced resolution image based on the number of low resolution images through a second sensor (e.g., second plurality of low resolution images) through a processor. The expansion coefficients are expressed in terms of the number of low resolution images through a first sensor (e.g., first plurality of low resolution images).

10 Claims, 7 Drawing Sheets

MODEL-INDEPENDENT GENERATION OF AN ENHANCED RESOLUTION IMAGE FROM A NUMBER OF LOW RESOLUTION IMAGES

FIELD OF THE INVENTION

This disclosure relates generally to a field of image processing and, more particularly, to a model independent generation of an enhanced resolution image from a number of low resolution images.

BACKGROUND

An image processing device (e.g., a camera) may include a digital sensor therein that, in turn, may include a number of sensor elements. The limited number of sensor pixels associated with the aforementioned sensor elements may limit the resolution of a digital image captured through the image processing device. Utilizing the digital sensor may result in fine details of the digital image being "blocky," and, therefore, not resolvable. Increasing dimension(s) of the sensor and/or the sensitivity thereof may result in the image processing device capturing high quality digital images but there may be increased cost(s) associated therewith. Moreover, there may be physical limit(s) associated with sensor manufacturing. For example, large spacing between pixels of the sensor are imposed by the physical limits of thermal imaging systems.

The resolution of a digital image may be enhanced through super-resolution, which may involve fusing a number of low resolution images of a same scene. Motion-based super-resolution may involve the assumption of each low resolution image being different from other low resolution images due to relative scene motion. Moreover, motion-based super-resolution may involve solving inverse problems, whose solutions may be required to be insensitive to model estimation errors and/or to be stable with respect to small errors in captured images. Further, the model involved therein may need to be implementable with reasonable computational power requirements. However, motion estimation method(s) may be difficult, computationally expensive and/or inaccurate, especially when the recorded images have low resolution.

Motionless super-resolution may involve the generation of a super-resolved image by fusing a number of slightly differing low resolution images of the same scene. Here, the difference may be due to varying blurring processes. However, as motionless super-resolution may also involve a model-based approach, the solutions therefrom may also be sensitive to errors therein.

SUMMARY

Disclosed are a method, an apparatus and/or a system of model-independent generation of an enhanced resolution of image from a number of low resolution images.

In one aspect, a method includes capturing a number of low resolution images through a first sensor (e.g., first plurality of low resolution images) and a number of low resolution images through a second sensor (e.g., second plurality of low resolution images). The first sensor has a higher resolution than the second sensor. The method also includes estimating expansion coefficients of polyphase components of an enhanced resolution image based on the number of low resolution images through a second sensor (e.g., second plurality of low resolution images) through a processor. The expansion coefficients are expressed in terms of the number of low resolution images through a first sensor (e.g., first plurality of low resolution images). The polyphase components of the enhanced resolution image are a shifted and downsampled version of the enhanced resolution image.

In another aspect, a method includes capturing a number of low resolution images through a first sensor (e.g., first plurality of low resolution images) and a number of low resolution images through a second sensor (e.g., second plurality of low resolution images). The first sensor has a higher resolution than the second sensor. The method also includes selecting a low resolution image of the number of low resolution images through a second sensor (e.g., second plurality of low resolution images) as a reference polyphase component of an enhanced resolution image to be determined. The reference polyphase component is a shifted and a J×J downsampled version of the enhanced resolution image. The method further includes estimating a sub-polyphase component of each of a number of primary polyphase components of the enhanced resolution image. The primary polyphase components of the enhanced resolution image is a shifted and I×I downsampled version of the enhanced resolution image. I and J are integers such that J>I>1. The sub-polyphase component is a shifted and a J×J downsampled version of the corresponding each of the number of primary polyphase components of the enhanced resolution image. Furthermore, the method includes estimating expansion coefficients of the each of the number of the primary polyphase components of the enhanced resolution image based on the estimated sub-polyphase component of each of the number of the primary polyphase components of the enhanced resolution image to determine the enhanced resolution image. The expansion coefficients enable each of the number of the primary polyphase components to be expressed as a linear combination of the number of low resolution images through a first sensor (e.g., first plurality of low resolution images).

In yet another aspect, a system includes a first sensor to capture a number of low resolution images through a first sensor (e.g., first plurality of low resolution images). The system also includes a second sensor to capture a number of low resolution images through a second sensor (e.g., second plurality of low resolution images). The first sensor has a higher resolution that the second sensor. The system further includes a processor to estimate expansion coefficients of polyphase components of an enhanced resolution image based on the number of low resolution images through a second sensor (e.g., second plurality of low resolution images). The expansion coefficients are expressed in terms of the first sensor to capture a number of low resolution images through a first sensor (e.g., first plurality of low resolution images). The polyphase components of the enhanced resolution image are shifted and downsampled versions of the enhanced resolution images. Furthermore, the system includes a memory associated with the processor. The memory includes storage locations configured to be addressable through the processor.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of model-independent generation of an enhanced resolution of image from a number of low resolution images. Although the present embodiments have been described with reference to specific example embodiments, it will be evident that various modifications and changes may be made to these embodiments without departing from the broader spirit and scope of the various embodiments.

Figure 1:
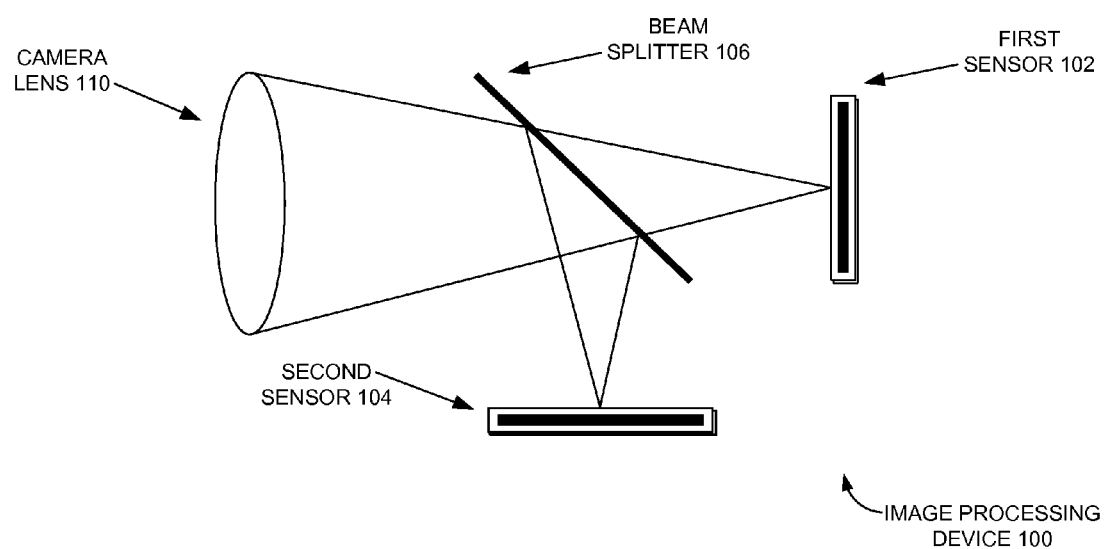
FIG. 1 is a schematic view of a two sensor configuration of an image processing device utilized to generate an enhanced resolution image from a number of low resolution images, according to one or more embodiments.

FIG. 1a schematic view of a two sensor configuration of an image processing device utilized to generate an enhanced resolution image from a number of low resolution images, according to one or more embodiments. In particular, FIG. 1 illustrates a first sensor 102, a second sensor 104, an image sensor device 100, a beam splitter 106, and a camera lens 110.

In one or more embodiments, the enhanced resolution (ER) image may be generated from a number of low resolution (LR) images through estimating expansion coefficients of polyphase components (PPCs) of the ER image. In one or more embodiments, the LR image may form the basis to reconstruct the PPCs of the ER image. The ER image may be a high resolution (HR) image. The expansion coefficients of the PPCs of the ER image may be estimated based on a small portion (sub-PPC) of each PPC. The sub-PPCs may be determined based on the property of sampling diversity through a single PPC, as a reference. The single PPC used as a reference may be of a different downsampling factor. The single PPC used as reference (e.g., reference PPC) may be estimated with two set of LR images. In one or more embodiments, FIG. 1 illustrates a two-sensor 102,104 image sensor device 100 configuration to capture the two set of LR images. The image processor device 100 may be configured to support a property of sampling rate diversity through which a sub-PPC of the PPC of the ER image may be determined based on the reference PPC.

In one or more embodiments, the image sensor device 100 may capture a number of low resolution images through the first sensor 102 (e.g., first plurality of low resolution images 508) and a number of low resolution images through the second sensor 102 (e.g., second plurality of low resolution images 510). The first sensor 102 may have a higher resolution than the second sensor 104. The first sensor 102 and/or the second sensor 104 may be CCD arrays. The first sensor 102 and the second sensor 104 may be associated with the same image processing device 100. In another embodiment, the first sensor 102 and the second sensor 104 may be associated with a corresponding first image processing device and/or a second image processing device.

In some embodiments, in order for both the first sensor 102 and the second sensor 104 to be able to 'see' a same scene simultaneously, the beam splitter 106 may be installed in the optical path of the camera lens 110. A beam splitter 106 may be an optical device that splits a beam of light in two. In an example embodiment, the optical device may be a half silvered mirror and/or a cube prism. Half of the light may be transmitted through to the primary sensor 102 while the other half is reflected (e.g., at approximately a right angle) towards the secondary sensor 104.

The ER image (e.g., original ER image) may undergo different linear transforms that can be approximated as a set of linear shift invariant transforms over different sub-regions of the ER image. The linearly transformed ER image may then be downsampled, resulting in different LR images. The LR images may form a basis that spans the set of the PPCs 412 of the ER image. A reference PPC 402 of a different sampling may be used to estimate the sub PPCs 404 of the PPCs (primary) of the ER image based on a property of sampling diversity. To estimate the reference PPC 402, LR images may be acquired through imaging sensors of different sensor densities. The PPCs 412 of the ER image may be reconstructed (e.g., blind reconstruction, so that unknown motion and/or blurs can be incorporated) through solving linear systems of equations where the number of unknowns is equal to the number of available LR images.

In one or more embodiments, a polyphase component (PPC) 412 of the ER image may be a shifted and downsampled version of the ER image 512. Given the downsampling factor, I, to be the same in the vertical and horizontal direction, an ER image may be decomposed into $I^2$ PPCs. In an example embodiment, the first PPC is obtained through downsampling the first pixel in the first row of the ER image by I×I. The second PPC is obtained through downsampling the second pixel in the first row. The I-th PPC corresponds to downsampling beginning with the I-th pixel in the first row of the ER image. Similarly, the (I+1)-th PPC corresponds to downsampling beginning with the first pixel in the second row and the $I^2$-th PPC is obtained by downsampling starting with the I-th pixel in the I-th row.

The LR image may have the same number of pixels of a PPC of the ER image. In one or more embodiments, when the LR image has the same number of pixels of the PPC of the ER image, the PPC may be written as a linear combination of the LR images. In some embodiments, the PPC may be written as a linear combination of the LR images when the number of LR images (linearly independent) is equal to the number of pixels in the PPC. In certain embodiments, if only one LR image is available, the reconstructed PPCs 412, in terms of this single LR image, may be a scaled version of LR image. In one or more embodiments, a reasonable number of LR images may be enough to form a complete basis in terms of which the PPCs 412 can be represented.

In another embodiment, if each LR image corresponds to downsampling a differently transformed ER image, the set of LR images form a complete basis if each transform kernel may be approximated as a set of r linear shift invariant (LSI) kernels of the same finite size, acting on r different areas of the ER image, and $$K \geq rL_1L_2 \qquad (1)$$

where K is the number of LR images, $L_1 \times L_2$ is the size of an LSI kernel, and $$L_1 > I \text{ and } L_2 > I \tag{2}$$

In an example embodiment, a lower limit (in terms of the complexity and extent of the transforms) on the number of LR images needed to form a complete basis may be given by example Equation (1) and example Equation (3) may ensure that the LR images are different enough from each other to contribute to the computation of the super-resolved ER image.

In one or more embodiments, if each LR image is a downsampled version of the ER image after going through a finite support linear shift invariant (LSI) transform, the lexicographical column-vector representation of the k-th $m_1 \times m_2$ LR image, and the lexicographical unwrapping of the k-th LSI kernel may be expressed as example Equation (4) as follows:

$$[\underline{y}_1 \ldots \underline{y}_K] = [\underline{u}_{1,1} \ldots \underline{u}_{L_1,L_2}][\underline{h}_1 \ldots \underline{h}_K] \Leftrightarrow Y = UH \tag{4}$$

where $\underline{y}_K$ is the lexicographical column-vector representation of the k-th $m_1 \times m_2$ LR image, and $\underline{h}_K$ is the lexicographical unwrapping of the k-th LSI kernel. The vector $\underline{u}_{L_1,L_2}$ is the lexicographical ordering of the $(L_1, L_2)$-thsubmatrix of the $m_1 \times m_2$ ER image, u. In one or more embodiments, lexicographical ordering of the $(L_1, L_2)$-thsubmatrix of the $m_1 \times m_2$ ER image, u may be expressed as example Equation (5)

$$u_{l_1,l_2}(k_1 k_2) \triangleq u(k_1 I + L_2 - l_1 + 1, k_2 I + L_1 - l_2 + 1) \text{ for } l_1 = 1, \ldots, L_2, l_2 = 1, \ldots, L_1 \tag{5}$$

In some embodiments, if $L_1 = I$ and $L_2 = I$, then all the submatrices $\{\underline{u}_{L_1,L_2}\}$ may be the PPCs 412 of the ER image u. In certain embodiments, however, when $L_1 > I$ and $L_2 > I$ only $I^2$ of the submatrices $\{\underline{u}_{L_1,L_2}\}$ may be the PPCs 412 of the ER image, u.

In one or more embodiments, example Equation (4) may be a reformulation of multiple 2-D convolution operations followed by downsampling. In some embodiments, LR images may be mixtures of sub-images of the ER image based on example Equation (4). In certain embodiments, the LR images may be viewed as a mixture of PPCs 412 of the ER image. However, the PPCs 412 are highly correlated signals. In one or more embodiments, the highly correlated PPCs 412 may be un-mixed through a hardware modification of the imaging device to enable the use of the property of sampling rate diversity. The problem of un-mixing the PPCs 412 may be formulated as a change of basis problem through enabling the use of property of sampling rate diversity. When the problem of un-mixing the PPCs 412 is formulated as a change of basis problem, example Equation (4) may serve as an insight as to how many LR images might be enough to fully represent the PPCs 412. In some embodiments, the PPCs 412 may be represented wholly and/or partially by any available LR images, even if said LR images are loosely represented by example Equation (4).

In an example embodiment, each LSV transform kernel may be approximated as r LSI kernels over r different subregions of the ER image. Each of the subregions may be treated as r different ER images where the PPCs 412 of each one of them may be separately reconstructed. In another embodiment, the PPCs 412 of the whole ER image may be reconstructed with r times more LR images because in the case of a LSV transform, an LR image may be viewed as a linear local mixing of subregions of the PPCs 412.

A primary PPC of the ER image is a PPC corresponding to the I×I downsampled version, whereas a secondary PPC of the same ER image may be a PPC corresponding to J×J downsampled version, where I and J are relatively prime integers and $$J > I > 1$$

For example, any two consecutive integers are relatively prime numbers.

The property of sampling rate diversity states that any primary PPC may share a sub PPC 404 of $$\frac{M_1 M_2}{I^2 J^2}$$

pixels with any secondary PPC, where $M_1 \times M_2$ is the size of the ER image and $M_1$ and $M_2$ are integer multiples of IJ. In an example embodiment, if a single secondary PPC is known, then a portion (a sub PPC 404) of each of the number of the primary PPC 412 of the ER image may be obtained through the single secondary PPC that is known, based on the property of sampling rate diversity. Obtaining a portion of each primary PPC 412 based on the single secondary PPC may enable computing the expansion coefficients 408 of the primary PPC in terms of the LR basis 406 (the set of LR images). The single secondary PPC (referred to as reference PPC 402 henceforth) may be termed as the reference PPC 402.

In another embodiment, if $U_n$ is one of the $I^2$ PPCs corresponding to the I×I downsampling, $U_m$ is one of the $J^2$ PPCs corresponding to J×J downsampling, and I and J are relatively prime, then $U_q$, one of the $I^2 J^2$ PPCs of the ER image corresponding to $\downarrow IJ \times IJ$, may be a subpolyphase component (sub PPC 404), $U_{n,j}$, of $u_n$ corresponding to downsampling $U_n$ by J×J, as well as a subpolyphase component, $U_{m,i}$, of $U_m$ corresponding to downsampling $U_m$ by I×I, for q=T (m, n), j=$T_n$(m), and i=$T_m$(n), where T, $T_n$, and, $T_m$ are 1-1 mappings between (m, n), m, n and q, j, i, respectively. This aforementioned property may be termed as the property of sampling rate diversity. In an example embodiment, the sampling rate diversity may be achieved as follows.

If the sensor with the higher resolution (e.g., first sensor 102), has resolution $$m_1 \times m_2$$

pixels, then the second sensor 104 may need to have a resolution of at most $$(I/J)m_1 \times (I/J)m_2$$

pixels to produce a super-resolved ER image, with a resolution enhancement factor of ↑I×I, i.e. with number of pixels $$M_1 \times M_2 = Im_1 \times Im_2$$

For example, if the first sensor 102 has a resolution of 480×640 pixels, and an ER image of 1920×2560 pixels (a ↑4×4 resolution enhancement) is required, then the second sensor 104 must have a resolution of at most 384×512 pixels.

Figure 2:
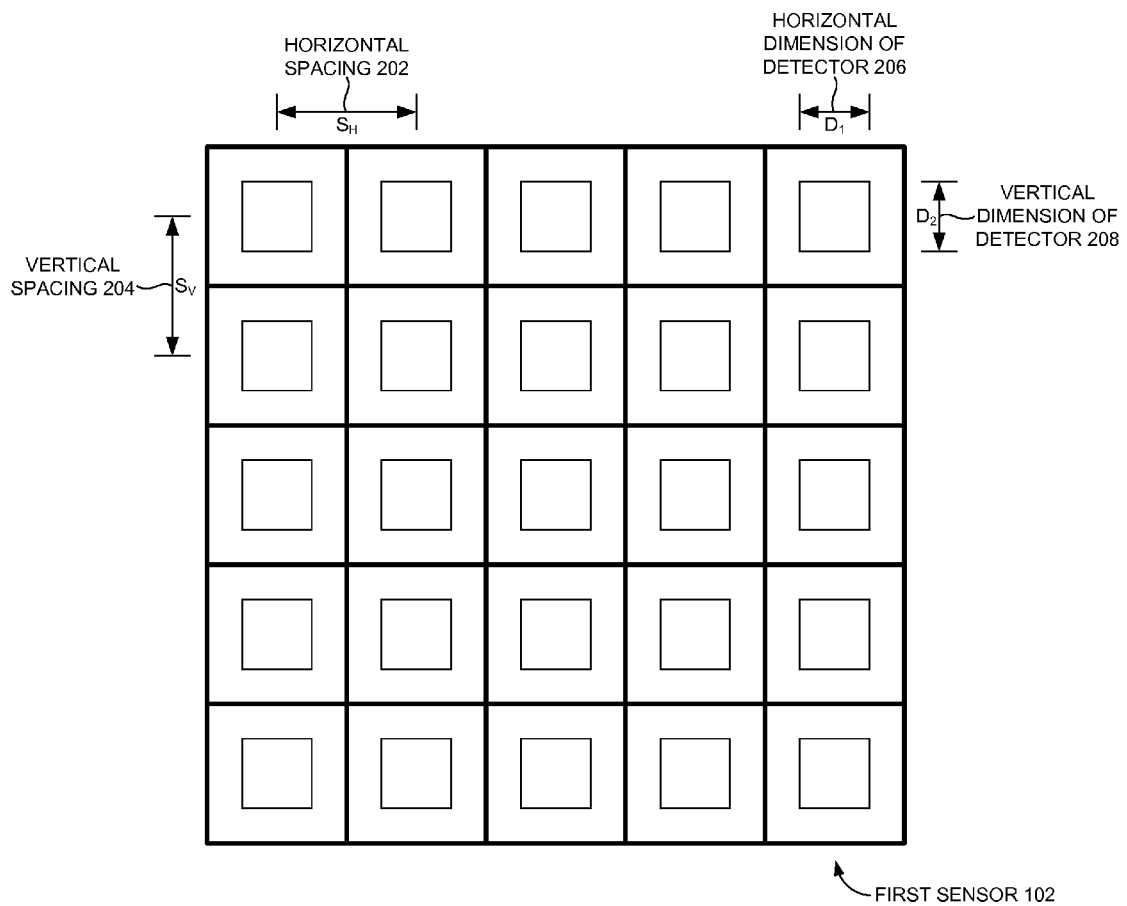
FIG. 2 is a schematic view of relevant geometric details of the first sensor of the image processing device shown in FIG. 1, according to one or more embodiments.
Figure 3:
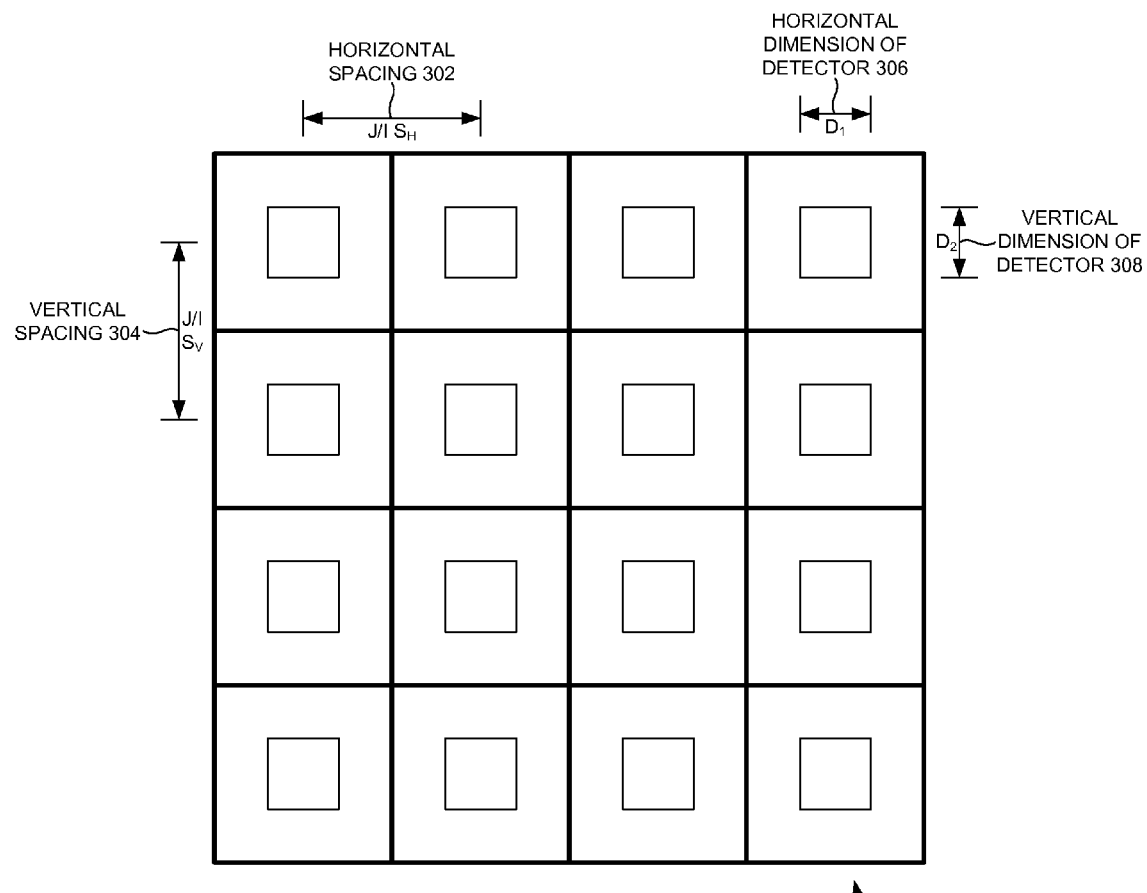
FIG. 3 is a schematic view of relevant geometric details of the second sensor of the image processing device shown in FIG. 1, according to one or more embodiments.

FIG. 2 and FIG. 3 is a schematic view of relevant geometric details of the first sensor and the second sensor of the image processing device shown in FIG. 1, according to one or more embodiments. In particular, the geometric details of the primary sensor 102 and secondary sensor 104 illustrated in FIG. 2 and FIG. 3 may be configured to achieve the sampling rate diversity. The first sensor 102 may capture a number of low resolution images (e.g., first plurality of low resolution images 508) and the second sensor 104 may capture a number of low resolution images (e.g., second plurality of low resolution images 510). The first sensor 102 may have a higher resolution than the second sensor 104. In an example embodiment, a first sensor 102 may include a uniform array of detectors (e.g., sensing elements) with horizontal spacing 202, $S_h$, and vertical spacing 204, $S_v$. If the first sensor 102 may include a uniform array of detectors (e.g., sensing elements) with horizontal spacing 202, $S_h$, and vertical spacing 204, $S_v$, then the secondary sensor 104 may include a uniform array of detectors with horizontal spacing 302 of $$\frac{J}{I}S_h,$$

and vertical spacing 304 of $$\frac{J}{I}S_v,$$

to achieve the sampling rate diversity that may allow for a resolution enhancement of I×I, where J>I>1 and I and J are relatively prime integers. In particular, FIG. 2 and FIG. 3 also illustrates a horizontal dimension of the detector 206 and a vertical dimension of the detector 208 of the first sensor 102 and a horizontal dimension of the detector 306 and a vertical dimension of the detector 308 of the second sensor 104 respectively.

In one or more embodiments, the hardware of the image processing device 100 may be modified to support sampling rate diversity, to estimate the reference PPC 402. In some embodiments, the reference PPC 402 may be estimated through choosing one LR image of the second plurality of the LR images as the reference PPC 402. In certain embodiments, any one LR image of the number of LR images captured through the second sensor 104 (e.g., second plurality of LR images 510) may be viewed as secondary (reference) PPC of some ER images. When one of the LR images of the number of LR images captured through the second sensor 104 (e.g., second plurality of LR images 510) is chosen as a reference (secondary) PPC, the quality of the super-resolved ER image may depend on how close the LR images of the first plurality of the LR images are to being a complete basis for the primary PPCs 412 of the ER image. In certain embodiments, the quality of the super-resolved ER image may also depend on the quality of the LR image of the number of LR images captured through the second sensor 104 (e.g., second plurality of LR images 510), chosen as the reference PPC 402.

In one or more embodiments, there may be two criteria for choosing the reference PPC 402 from among the number of LR images captured through the second sensor 104 (e.g., second plurality of LR images 510). First, the LR images of the number of LR images captured through the second sensor 104 (e.g., second plurality of LR images 510) that are farthest from a downsized mean of the number of LR images captured through a first sensor 102 (e.g., a first plurality of LR images 508), $\mu_d^P$ may be avoided.

A PPC may be blocky (e.g., due to aliasing). A blocky PPC may have large high frequency components. Accordingly, the number of LR images captured through the second sensor 104 (e.g., second plurality of LR images 510) that have the largest high frequency components may be the sharpest LR images. The sharpest images may be chosen for the reference PPC 402. Second, for selecting the 'best candidate' low resolution image of the number of LR images captured through the second sensor 104 (e.g., second plurality of LR images 510) as a reference PPC 402, the following criteria may be used $$\max_k \frac{\|y_k^S ** \Phi\|_F^2}{\|y_k^S - \mu_d^P\|}$$

where $y_k^S$, is the k-th secondary LR image, $\Phi$ is a unity-gain differentiator and ** denotes the 2-D convolution. The ER image may then be computed $J^2$ times, based on the selected LR image of the number of LR images captured through the second sensor 104 (e.g., second plurality of LR images 510) (reference PPC 402 of the ER image), as being the m-th secondary PPC, for m=1 ... $J^2$. In one or more embodiments, the best (e.g., smoothest) computed ER image may be selected as the final solution.

Computation of the ER Image Based on a Reference PPC, Using the Number of LR Images Captured Through a First Sensor (e.g., A First Plurality of LR Images)

In one or more embodiments, using a reference PPC 402, $U_m$ for any m between 1 and $J^2$, a sub PPC 404 of each one of the I×I downsampled primary PPCs 412, $\{U_n\}_{n=1}^{I^2}$ may be estimated based on the property of sampling rate diversity. In some embodiments, using the reference PPC 402, $U_m$, the $I^2$ sub PPCs 404 may be obtained through $$U_{n,j} = U_{m,i} = D_i U_m \text{ for } n=1,\ldots,I^2, i=T_m(n) \text{ and } j=T_n(m) \quad (6)$$

where $D_i$ is the shifted and I×I downsampled matrix that gives the i-th sub PPC of the reference PPC 402.

In certain embodiments, since the j-thsub PPC, $U_{n,j}$ is related to the n-thPPC, $U_n$ via $$U_{n,j} = D_j U_n \quad (7)$$

where $D_j$ is a J×J downsampled matrix (performing shifting and downsampling) that gives the j-th sub PPC 404 from the n-thPPC, and assuming that the available LR images of the number of LR images captured through a first sensor 102 (e.g., a first plurality of LR images 508) form a complete basis that can span the primary PPCs 412, i.e.

$$U_n = Y x_n \text{ for } n=1,\ldots,I^2, \quad (8)$$

where $x_n$ are the expansion coefficients 408 of $U_n$ in terms of the (primary) LR basis 406, each primary PPC of the ER image may be estimated through solving for expansion coefficients 408 of the each primary PPC of the ER image via $$D_j U_n = D_j Y x_n \text{ for } n=1,\ldots,I^2 \quad (9)$$

but $D_j U_n = U_{n,j} = U_{m,i} = D_i U_m$ and thus the previous equation can be rewritten as $$D_j Y x_n = D_i U_m \text{ for } n=1,\ldots,I^2 \quad (10)$$

which may be a problem of the form $$Ax=b \quad (11)$$

where
$A=D_j Y$
$b=D_i U_m$
$x=x_n$

Example equation (11) uses LR images on both sides of the equation. In other words, there may not be a system matrix in example Equation (11). In example Equation (11), the matrix A may be a data matrix including sub LR images reordered as columns.

Figure 4:
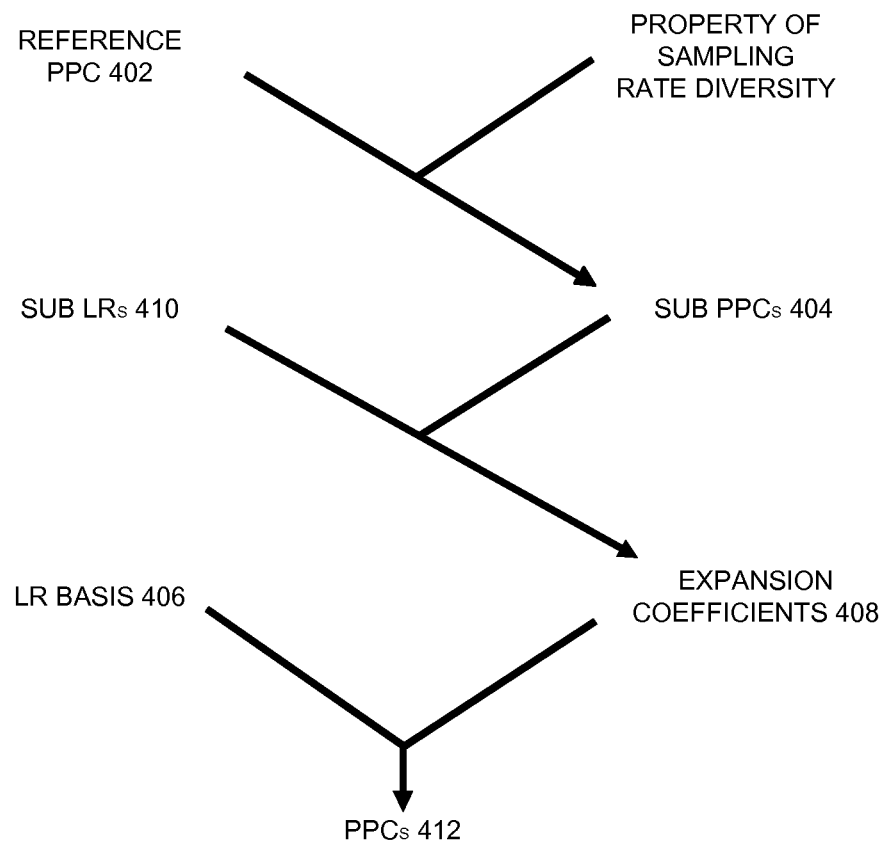
FIG. 4 is a pictorial view of a polyphase components (PPC) reconstruction through utilizing low resolution (LR) image as a basis, according to one or more embodiments.

FIG. 4 is a pictorial view of a polyphase components (PPC) reconstruction through utilizing low resolution (LR) image as a basis, according to one or more embodiments. In particular, FIG. 4 illustrates a reference PPC 402, a sub PPC 404 of the primary PPC of the ER image 404, an LR basis 406, sub-LRs 410, expansion coefficients 408 of the primary PPCs of the ER image and the primary PPCs 412 of the ER image.

In one or more embodiments, the PPC 412 of the ER image may be reconstructed using LR images based on the reference PPC 402 and/or the property of sampling rate diversity. In one or more embodiments, the property of sampling rate diversity may be used to find sub-PPCs 404 of all the primary PPCs 412 (e.g., I×I downsampled PPCs) of the ER image through the reference PPC 402 of different sampling. Reconstructing the primary PPCs 412 (I×I downsampled PPCs) using LR image may include finding the expansion coefficients 408 of the primary PPCs 412 of the ER image in terms of the LR basis 406 using the sub PPCs 404 of the primary PPCs 412 (I×I downsampled PPC s) of the ER image. In one or more embodiments, based on the linearity of transforms (e.g., linear shift invariant transforms, linear shift variant transforms), the LR images may be viewed as a basis spanning a subspace where the PPCs 412 exist.

The system of equations to find the expansion coefficients 408 of the primary PPCs 412 in terms of the LR basis 406, using their sub PPCs 404 may be overdetermined when the number of the pixels in a sub PPC 404, p (which is the same number of pixels in sub LR images) is larger than the number of LR images, K, $$p = M_1 M_2 / I^2 J^2 > K \tag{12}$$

and example Equation (11) has the least squares (LS) solution $$\hat{x} = (A^T A)^{-1} A^T b \tag{13}$$

Based on the example Equation (12) the systems of equations that are solved may become more overdetermined through super-resolving larger LR images. For example, obtaining an ER image that is 4×4 times larger than LR images of 200×200 may give a lower variance estimate, than super-resolving a smaller LR image of size 100×100. In one or more embodiments, overdeterminedness of the systems of equation may help to get more accurate estimates, if noise is included in the data matrix on both sides of Eqn. 5. However, noise may effectively render a complete basis as incomplete, in which case overdeterminedness may not be very helpful in getting a more accurate LS solution, especially at high levels of noise. Moreover, since the primary PPCs 412 are computed through multiplying their corresponding expansion coefficients 408 with the LR basis 406, the computed primary PPCs 412 may be even noisier than the LR images. In one or more embodiments, the LR images may need to be pre-denoised based on the noise level in the LR images, before the LR images may be used to compute a super-resolved (e.g., final version of the ER image) ER image 512. In some embodiments, the number of LR images captured through a first sensor 102 (e.g., a first plurality of LR images 508) and the number of LR images captured through the second sensor 104 (e.g., second plurality of LR images 510) may be deionised prior to estimating the sub PPC 404 of the each of the number of PPCs 412 and the expansion coefficients 408 of the sub PPC 404 of each of the number of PPCs 412.

Principal component analysis (PCA) is known to be the minimum mean square error (MMSE) linear compressor of the data. The aforementioned property renders PCA the optimal linear denoiser when the data is contaminated with additive zero-mean, same variance and/or uncorrelated noise. In one or more embodiments, the method selected to pre-deionise the number of LR images captured through a first sensor 102 (e.g., a first plurality of LR images 508) and/or the number of LR images captured through the second sensor 104 (e.g., second plurality of LR images 510) may be based on the property of the method to be the MMSE linear compressor of the data.

In one or more embodiments, to PCA pre-denoise a data set, a mean and covariance matrix of the data set may be estimated. Since, the number of observations (e.g., LR images) is far smaller than the dimensionality of the observations (e.g., number of pixels in a LR image); a sample covariance matrix may provide a poor estimate of the true covariance matrix of the LR images. Accordingly, sub LR images may be deionised as the process of deionising the sub LR images may reduce the number of parameters to be estimated (e.g., smaller covariance matrix) as well as provides more observations (e.g., sub LR images). In some embodiments, a mean and a covariance of sub LR images may be obtained through the downsampling the number of LR images captured through a first sensor 102 (e.g., a first plurality of LR images 508) and number of LR images captured through the second sensor 104 (e.g., second plurality of LR images 510) are downsampled by J×J and I×I, respectively. The mean and covariance obtained through downsampling may be estimated. In certain embodiments, the first plurality of low resolution images and the second plurality of low resolution images may be deionised through Principal Component Analysis (PCA) based on the estimated covariance. In particular, both the number of LR images captured through a first sensor 102 (e.g., a first plurality of LR images 508) and number of LR images captured through the second sensor 104 (e.g., second plurality of LR images 510) are downsampled by J×J and I×I, respectively, obtaining $KJ^2 + K^S I^2$ sub LR images of the same size, where $K^S$ is the number of number of LR images captured through the second sensor 104 (e.g., second plurality of LR images 510). From these sub LR images the sample mean and sample covariance may be calculated, and then the sub LR images may be PCA denoised through the eigenvectors of the empirically estimated covariance matrix as follows $$\hat{y}_k^{sub} = DD^T(y_k^{sub} - \hat{\mu}) + \hat{\mu} \tag{14}$$

where $y_k^{sub}$ is the k-th sub LR image, $\hat{y}_k^{sub}$ is the denoised k-th sub LR image, $\hat{\mu}$ is the sample mean and D is the matrix of the orthonormal eigenvectors of the sample covariance matrix, corresponding to the largest $r_o$ Eigen values, where $r_o$ is a user defined parameter. In one or more embodiments, the strength of the deionising effect may depend of the value of $r_o$. The denoising effect may be stronger when the value of $r_o$ becomes lower. The chosen value may fall in the range $$K \leq r_0 \leq \min(KJ^2 + K^S I^2, M_1 M_2 / I^2 J^2) \tag{15}$$

Choosing for $r_o$ a value lower than K, which is the number of primary LR images, may make the data matrix, A, in example Equation (11), rank-deficient. The sample mean may be estimated through the example Equation (16) as follows $$\hat{\mu} = \frac{1}{KJ^2 + K^S I^2} + \sum_{k=1}^{KJ^2 + K^S I^2} y_k^{sub} \tag{16}$$

and the sample covariance may be computed by $$\hat{C}_y = \frac{1}{KJ^2 + K^S I^2 - 1} \left( \sum_{k=1}^{KJ^2+K^S I^2} (\underline{y}_k^{sub} - \hat{\mu})(\underline{y}_k^{sub} - \hat{\mu})^T \right) \quad (17)$$

In one or more embodiments, post-processing the final version (e.g., super-resolved) of the ER image may be desired to enhance the quality of the ER image. In particular, the final version of the ER images may be denoised based on a Total Variation (TV) denoising method. In some embodiments, the final version of the ER image may be blurred because either the lens 110 blur and/or the sensor 102,104 blur are fixed from frame to frame and thus they may not be taken into account by the super-resolution technique. In addition, if even the best (e.g., smoothest) LR image of the number of LR images captured through the second sensor 104 (e.g., second plurality of LR images 510), chosen as the reference PPC 402, is blurred (e.g., due to motion or atmospheric blur), then the final version of the ER image may be blurred as well. For sharpening the final version of the ER image, an Unsharp-Masking (UM) technique may be used. The UM method and the TV method may be well known to one skilled in the art; therefore, discussion associated therewith has been skipped.

After sharpening, the processed image may have irregularities in the pixel intensity level. For example, after sharpening, the processed image may include what looks like an impulsive noise around the edges. The irregularities may be due to the fact that the final version of the ER image is estimated through estimating its PPCs 412 separately and then interlacing the PPCs 412, which may cause some subtle irregularities in pixel intensity levels, especially around the edges, that become more pronounced after sharpening. The irregularities in the pixel intensity level of the processed image may be removed through a median filter.

Figure 5:
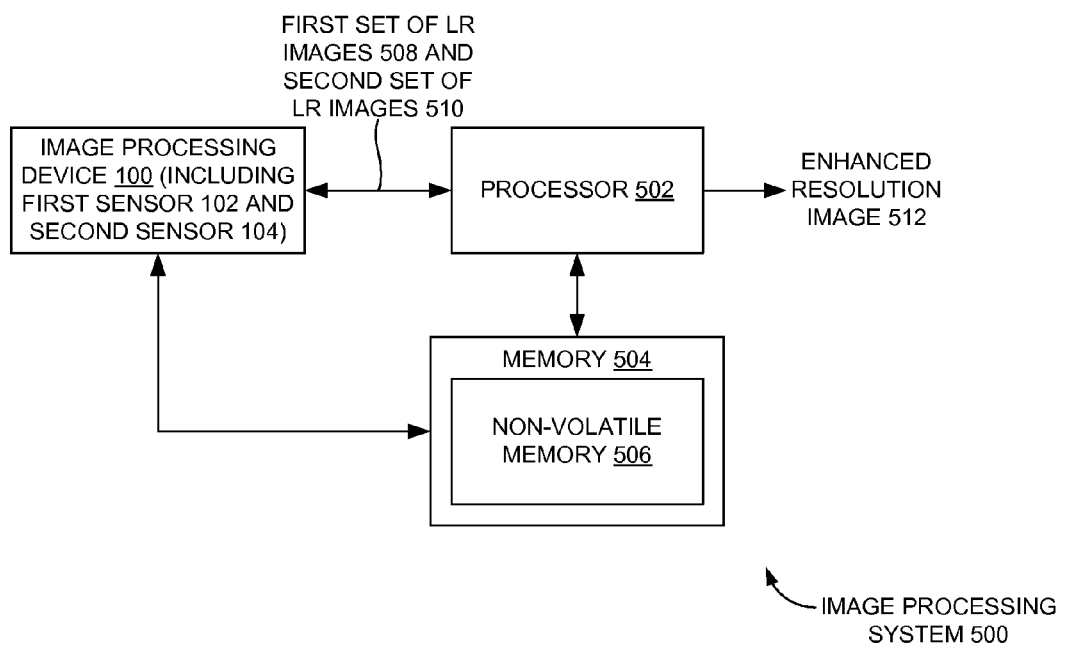
FIG. 5 is a schematic view of an image processing system to generate an enhanced resolution image from a number of low resolution images, according to one or more embodiments.

FIG. 5 is a schematic view of an image processing system to generate an enhanced resolution image from a number of low resolution images, according to one or more embodiments. In particular, the image processing system 500 in FIG. 5 illustrates an image processing device 100, a first plurality of low resolution (LR) images 508, a second plurality of low resolution images 510, a processor 502, a memory 504, a non-volatile memory 506 and an enhanced resolution image 512.

In one or more embodiments, the image processing device 100 may include the first sensor 102 and the second sensor 104. The first sensor 102 and the second sensor 104 may be associated with the same image processing device 100, a corresponding first image processing device and/or a second image processing device. The image processing device 100 may be configured to capture the first plurality of low resolution (LR) images 508 and the second plurality of low resolution images (LR) 510 through the first sensor 102 and the second sensor 104, respectively. In one or more embodiments, the first sensor 102 has a higher resolution than the second sensor 104. The image processing device 100 may be associated with a processor 502 and/or a memory 504. After capturing the plurality of images, the image processing device may transmit the number of LR images captured through a first sensor 102 (e.g., a first plurality of LR images 508) and the number of LR images captured through the second sensor 104 (e.g., second plurality of LR images 510) to the processor 502 to generate an enhanced resolution (ER) image 512 through the number of LR images captured through a first sensor 102 (e.g., a first plurality of LR images 508) and the number of LR images captured through the second sensor 104 (e.g., second plurality of LR images 510).

The processor 502 may be associated with the image processing device 100 and the memory 504. The processor 502 may receive the number of LR images captured through a first sensor 102 (e.g., a first plurality of LR images 508) and the number of LR images captured through the second sensor 104 (e.g., second plurality of LR images 510) from the image processing device 100. The processor 502 may be configured to generate an enhanced resolution (ER) image 512 through the number of LR images captured through a first sensor 102 (e.g., a first plurality of LR images 508) and the number of LR images captured through the second sensor 104 (e.g., second plurality of LR images 510). In one or more embodiments, the processor 502 is configured to estimate the expansion coefficients 408 of the PPC of the ER image based on the number of LR images captured through the second sensor 104 (e.g., second plurality of LR images 510) captured through the second sensor 104. In one or more embodiments, the expansion coefficients 408 of the PPC of the ER image is expressed in terms of the number of LR images captured through a first sensor 102 (e.g., a first plurality of LR images 508) captured through the first sensor 102. In some embodiments, the PPC of the enhanced resolution image may be a shifted and downsampled version of the ER image 512.

In one or more embodiments, to estimate the expansion coefficients 408 of the PPC of the ER image, the processor 502 may be configured to select a LR image of a number of LR images captured through the second sensor 104 (e.g., second plurality of LR images 510) as a reference PPC 402 of the ER image 512. The reference PPC 402 may be a shifted and a J×J downsampled version of the ER image 512. In one or more embodiments, the processor 502 may be configured to select the reference PPC 402 of the ER image 512 based on at least two criteria. One of the criteria may be to avoid LR images from the number of LR images captured through the second sensor 104 (e.g., second plurality of LR images 510) that are farthest from a downsized mean of the number of LR images captured through a first sensor 102 (e.g., a first plurality of LR images 508). The other criteria may be to select the LR image having high frequency components larger than another LR image in the number of LR images captured through the second sensor 104 (e.g., second plurality of LR images 510) as the reference PPC 402.

The processor 502 may be configured to estimate a sub PPC 404 of each of a plurality of primary PPC of the ER image 512. The primary PPC may be a shifted and an I×I downsampled versions of the ER image 512, where I and J are integers such that J>I>1. The sub PPC 404 of each of the plurality of the primary PPC may be a shifted and a J×J downsampled version of the corresponding each of the plurality of primary PPC of the ER image 512. The expansion coefficients 408 of each of the plurality of the PPC of the ER image 512 may be estimated through the processor 502 based on the sub PPC 404 of each of the plurality of primary PPC of the ER image 512 to determine the ER image 512. The expansion coefficients 408 may enable each of the plurality of the primary PPC to be expressed as a linear combination of low resolution images (e.g., a first plurality of LR images 508).

In one or more embodiments, the resolution of the ER image may be I times that of the first sensor 102 and/or J times that of the second sensor 104. The sub-PPC of the each of the plurality of primary PPC of the ER image 512 may also be a sub PPC 404 of the reference PPC 402 of the ER image 512 corresponding to a shifted and a I×I downsampled version of the reference PPC 402 of the ER image 512. In one or more embodiments, the processor 502 may be configured to estimate the ER image 512 a plurality of times based on the reference PPC 402. The plurality of times may range between 2 and $J^2$.

In one or more embodiments, the processor 502 may be configured to determine a final version of the ER image 512 based on a smoothness of the final version of the ER image 512. In one or more embodiments, the processor 502 may deionise the final version of the ER image 512 to enhance the quality of the final version of ER image 512. The final version of the ER image 512 may be deionised based on a TV deionising technique. The processor 502 may also be configured to deionise the number of LR images captured through a first sensor 102 (e.g., a first plurality of LR images 508) and the number of LR images captured through the second sensor 104 (e.g., second plurality of LR images 510) prior to estimating the sub PPC 404 of each of the plurality of primary PPC and the expansion coefficient of each of the plurality of the primary PPC. To deionise the number of LR images captured through a first sensor 102 (e.g., a first plurality of LR images 508) and the number of LR images captured through the second sensor 104 (e.g., second plurality of LR images 510) the processor 502 may downsample the number of LR images captured through a first sensor 102 (e.g., a first plurality of LR images 508) and the number of LR images captured through the second sensor 104 (e.g., second plurality of LR images 510) by J×J and I×I respectively. The processor 502 may estimate a mean and a covariance of sub-LR images obtained through the downsampling of the number of LR images captured through a first sensor 102 (e.g., a first plurality of LR images 508) and the number of LR images captured through the second sensor 104 (e.g., second plurality of LR images 510). The number of LR images captured through a first sensor 102 (e.g., a first plurality of LR images 508) and the number of LR images captured through the second sensor 104 (e.g., second plurality of LR images 510) may be deionised through a PCA (Principal Component Analysis) technique based on the estimated covariance. In a post processing operation, the processor 502 may be configured to sharpen the final version of the enhanced resolution image through an Unsharp Masking (UM) technique. The processor may also remove any irregularities in the pixel intensity of the final version of the ER image 512 through a median filter.

In one or more embodiments, the memory 504 may be associated with the processor 502. The memory 502 may be associated with the processor 502 and/or the image processing device 100. The memory 504 may include a non-volatile memory module 506. The image processing device 100 and the processor 502 may store information in the memory 504. The memory 504 may include storage locations configured to be addressable through the processor 502.

Figure 6:
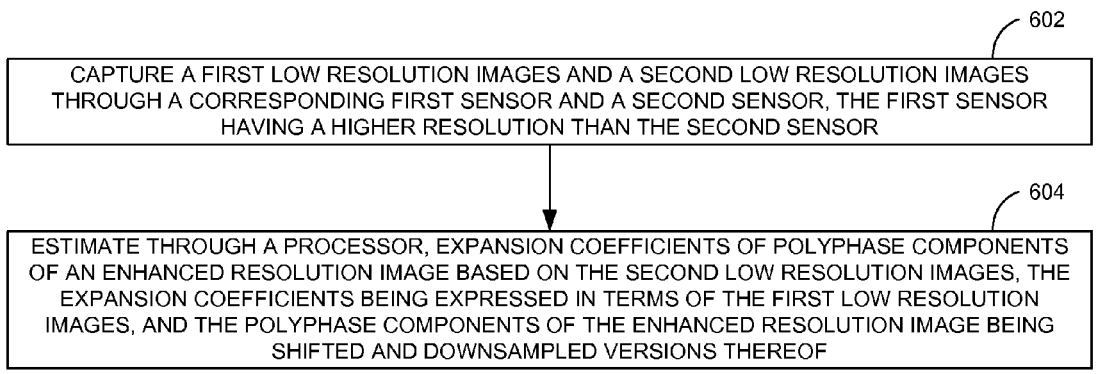
FIG. 6 is a process flow diagram illustrating a method of model-independent generation of an enhanced resolution image from a number of low resolution images, according to one or more embodiments.

FIG. 6 is a process flow diagram illustrating a method of model-independent generation of an enhanced resolution image from a number of low resolution images, according to one or more embodiments. In one or more embodiments the image processing device 100 captures a a number of LR images captured through a first sensor 102 (e.g., a first plurality of LR images 508) and a number of LR images captured through the second sensor 104 (e.g., second plurality of LR images 510) through a corresponding first sensor 102 and a second sensor 104 in operation 602. The first sensor 102 may be of a higher resolution than the second sensor 104. In operation 604 the processor 502 estimates the expansion coefficient of PPC 402 of an ER image 512 based on the number of LR images captured through the second sensor 104 (e.g., second plurality of LR images 510). The expansion coefficients 408 may be expressed in terms of the number of LR images captured through a first sensor 102 (e.g., a first plurality of LR images 508). The PPC of the ER image 512 may be a shifted and downsampled version of the PPC of the ER image 512.

The processor 502 may be configured to select an LR image of the number of LR images captured through the second sensor 104 (e.g., second plurality of LR images 510) as a reference PPC 402 of the ER image 512. The reference PPC 402 may be a shifted and a J×J downsampled version of the ER image 512. The processor 502 may be configured to estimate a sub-PPC of each of a plurality of primary PPCs 412 of the ER image 512. The sub-PPC of each of the plurality of primary PPC of the ER image may also be a sub-PPC of the reference PPC 402 of the ER image 512 corresponding to a shifted and a I×I downsampled version of the reference PPC 402 of the ER image 512.

In one or more embodiments, the primary PPC may be shifted and I×I downsampled versions of the enhanced resolution image where I and J are integers such that J>I>1. The sub-PPC may be a shifted and a J×J downsampled version of each of the plurality of primary PPC of the ER image. The processor 502 may estimate the expansion coefficients 408 of the each of the plurality of the primary PPC of the ER image based on the estimated sub-PPC of each of a plurality of primary PPCs 412 of the ER image 512 to determine the ER image 512. In one or more embodiments, the resolution of the enhanced resolution image may be I times that of the first sensor 102 and J times that of the second sensor 104. In one or more embodiments the expansion coefficients 408 may enable each of the plurality of the primary PPC to be expressed as a linear combination of the number of LR images captured through a first sensor 102 (e.g., a first plurality of LR images 508).

In one or more embodiments, the reference PPC 402 may be selected through a criteria of avoiding LR images from the number of LR images captured through the second sensor 104 (e.g., second plurality of LR images 510) that are farthest from a downsized mean of the number of LR images captured through a first sensor 102 (e.g., a first plurality of LR images 508) and/or through another criteria of selecting the LR image having high frequency components larger than another LR image in the number of LR images captured through the second sensor 104 (e.g., second plurality of LR images 510) as the reference PPC.

In one or more embodiments, the processor 502 may be configured to denoise the number of LR images captured through a first sensor 102 (e.g., a first plurality of LR images 508) and the number of LR images captured through the second sensor 104 (e.g., second plurality of LR images 510) prior to estimating the sub-PPC of the each of the plurality of primary PPC and the expansion coefficients 408 of each of the plurality of primary PPC. The processor 502 may estimate the ER image 512 a plurality of times based on the reference PPC. The processor 502 may be configured to determine a final version of the ER image based on a smoothness of the ER image 512. The processor 502 may be configured to deionise the final version of the ER image 512 to enhance the quality of the ER image 512. The final version of the ER image 512 may be sharpened through an UnsharpMasking (UM) technique and any irregularities in the pixel intensity of the ER image 512 may be removed through a median filter.

Figure 7:
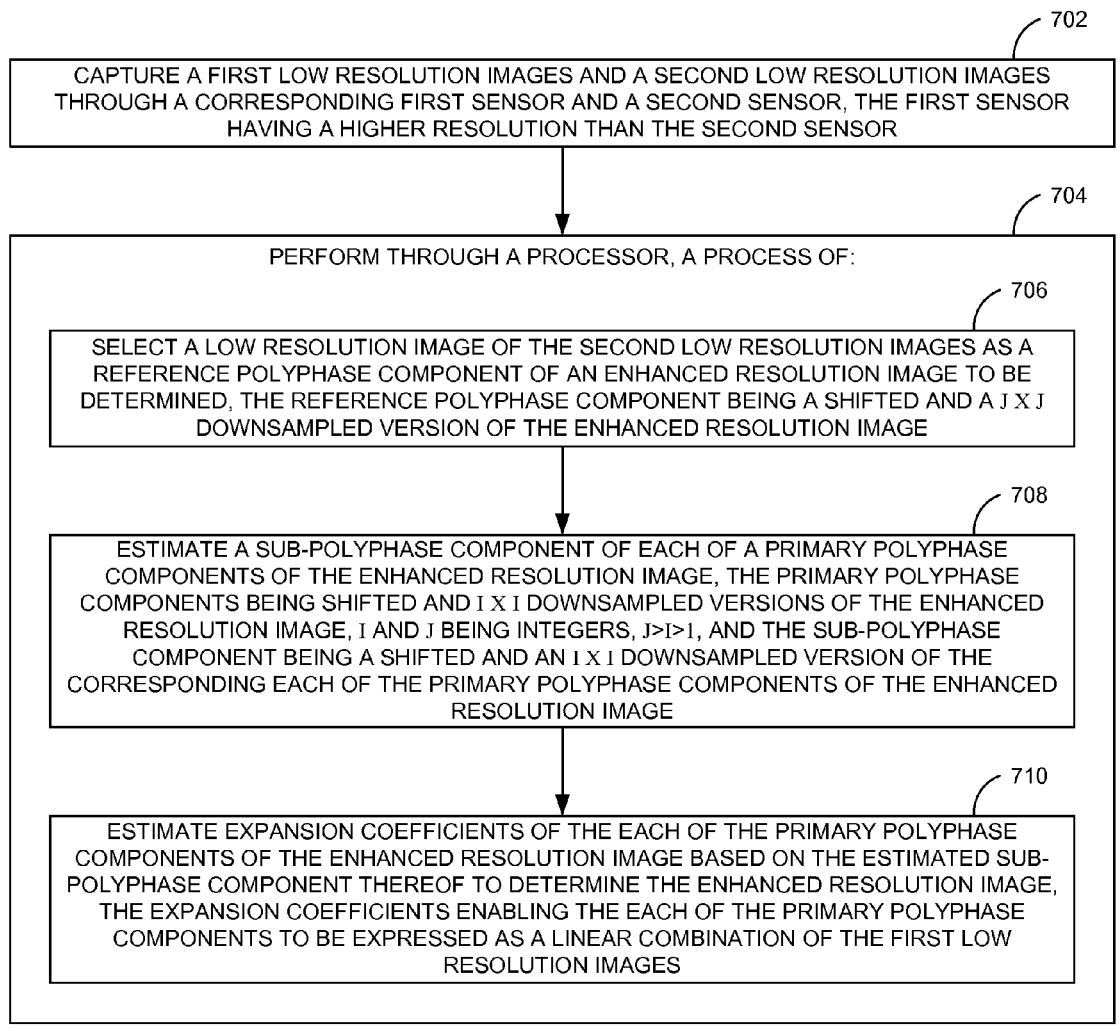
FIG. 7 is a process flow diagram illustrating the estimation of expansion coefficients of the polyphase components of the enhanced resolution image, according to one or more embodiments.

FIG. 7 is a process flow diagram illustrating the estimation of expansion coefficients of the polyphase components of the enhanced resolution image, according to one or more embodiments. In operation 702, the image processing device 100 captures a number of LR images captured through a first sensor 102 (e.g., a first plurality of LR images 508) and a number of LR images captured through the second sensor 104

(e.g., second plurality of LR images 510) through a corresponding first sensor 102 and a second sensor 104. The first sensor 102 may have a higher resolution than the second sensor 104. In operation 704, the processor may be configured to perform a set of operations to generate an ER image 512 based on a number of LR images captured through the image processing device 100. In operation 706, select an LR image of the number of LR images captured through the second sensor 104 (e.g., second plurality of LR images 510) as a reference PPC 402 of the ER image 512. The reference PPC 402 may be a shifted and a J×J downsampled version of the ER image. In operation 708, the processor may be configured to estimate a sub-PPC of each of a plurality of primary PPC of the ER image. The primary PPC may be a shifted and an I×I downsampled version of the ER image. I and J may be integers such that J>I>1. The sub-PPC may be a shifted and a J×J downsampled version of the corresponding each of the plurality of primary PPC of the ER image 512. In operation 710, the processor 502 may be configured to estimate the expansion coefficients 408 of each of the plurality of the primary PPC of the ER image 512 based on the estimated sub-PPC of the plurality of the primary PPC of the ER image 512 to determine the ER image 512. The expansion coefficients 408 may enable each of the plurality of the primary PPC to be expressed as a linear combination of the number of LR images captured through a first sensor 102 (e.g., a first plurality of LR images 508).

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware, firmware and software (e.g., embodied in a machine readable medium). For example, the various electrical structure and methods may be embodied using transistors, logic gates, and electrical circuits (e.g., application specific integrated (ASIC) circuitry and/or in digital signal processor (DSP) circuitry).

In addition, it will be appreciated that the various operations, processes, and methods disclosed herein may be embodied in a machine-readable medium and/or a machine accessible medium compatible with a data processing system (e.g., a computer devices), may be performed in any order (e.g., including using means for achieving the various operations). Accordingly, the specification and drawings are to be regarded in an illustrative rather than a restrictive sense.

The invention claimed is:

1. A method comprising:
capturing a first plurality of low resolution images and a second plurality of low resolution images through a corresponding first sensor and a second sensor, the first sensor having a higher resolution than the second sensor;
estimating, through a processor, expansion coefficients of polyphase components of an enhanced resolution image based on the second plurality of low resolution images, the expansion coefficients being expressed in terms of the first plurality of low resolution images, and the polyphase components of the enhanced resolution image being shifted and downsampled versions thereof,
wherein estimating, through the processor, the expansion coefficients of the polyphase components of the enhanced resolution image includes: selecting a low resolution image of the second plurality of low resolution images as a reference polyphase component of the enhanced resolution image to be determined, the reference polyphase component being a shifted and a J×J downsampled version of the enhanced resolution image,
wherein selecting the reference polyphase component of the enhanced resolution image includes:
avoiding low resolution images from the second plurality of low resolution images that are farthest from a downsized mean of the first plurality of low resolution images;
selecting the low resolution image having high frequency components larger than another low resolution image in the second plurality of low resolution images as the reference polyphase component;
estimating a sub-polyphase component of each of a plurality of primary polyphase components of the enhanced resolution image, the primary polyphase components being shifted and I×I downsampled versions of the enhanced resolution image, I and J being integers, J>I>1, and the sub-polyphase component being a shifted and an J×J downsampled version of the corresponding each of the plurality of primary polyphase components of the enhanced resolution image;
estimating expansion coefficients of the each of the plurality of the primary polyphase components of the enhanced resolution image based on the estimated sub-polyphase component thereof to determine the enhanced resolution image, the expansion coefficients enabling the each of the plurality of the primary polyphase components to be expressed as a linear combination of the first plurality of low resolution images,
wherein a resolution of the enhanced resolution image is I times that of the first sensor and J times that of the second sensor,
wherein the sub-polyphase component of the each of the plurality of primary polyphase components of the enhanced resolution image is also a sub-polyphase component of the reference polyphase component of the enhanced resolution image corresponding to a shifted and a I×I downsampled version thereof;
estimating the enhanced resolution image a plurality of times based on the selected reference polyphase component, the plurality of times ranging between 2 and $J^2$;
determining a final version of the enhanced resolution image based on a smoothness thereof:
denoising, through the processor, the first plurality of low resolution images and the second plurality of low resolution images prior to estimating the sub-polyphase component of the each of the plurality of primary polyphase components and the expansion coefficients thereof;
denoising, through the processor, the final version of the enhanced resolution image to enhance a quality thereof,
wherein denoising the first plurality of low resolution images and the second plurality of low resolution images includes:
downsampling the first plurality of low resolution images and the second plurality of low resolution images by J×J and I×I respectively;
estimating a mean and a covariance of sub-low resolution images obtained through the downsampling;
denoising the first plurality of low resolution images and the second plurality of low resolution images through Principal Component Analysis (PCA) based on the estimated covariance;
wherein denoising the final version of the enhanced resolution image to enhance the quality thereof is based on Total Variation (TV) denoising;

sharpening the final version of the enhanced resolution image through Unsharp Masking (UM); and removing irregularities in pixel intensity levels through a median filter.

2. A method comprising:

capturing a first plurality of low resolution images and a second plurality of low resolution images through a corresponding first sensor and a second sensor, the first sensor having a higher resolution than the second sensor; and performing, through a processor, a process of:

selecting a low resolution image of the second plurality of low resolution images as a reference polyphase component of an enhanced resolution image to be determined, the reference polyphase component being a shifted and a J×J downsampled version of the enhanced resolution image;

estimating a sub-polyphase component of each of a plurality of primary polyphase components of the enhanced resolution image, the primary polyphase components being shifted and I×I downsampled versions of the enhanced resolution image, I and J being integers, J>I>1, and the sub-polyphase component being a shifted and an J×J downsampled version of the corresponding each of the plurality of primary polyphase components of the enhanced resolution image; and estimating expansion coefficients of the each of the plurality of the primary polyphase components of the enhanced resolution image based on the estimated sub-polyphase component thereof to determine the enhanced resolution image, the expansion coefficients enabling the each of the plurality of the primary polyphase components to be expressed as a linear combination of the first plurality of low resolution images.

3. The method of claim 2, wherein a resolution of the enhanced resolution image is I times that of the first sensor and J times that of the second sensor, and wherein the sub-polyphase component of the each of the plurality of primary polyphase components of the enhanced resolution image is also a sub-polyphase component of the reference polyphase component of the enhanced resolution image corresponding to a shifted and a I×I downsampled version thereof.

4. The method of claim 2, wherein selecting the reference polyphase component of the enhanced resolution image includes:

avoiding low resolution images from the second plurality of low resolution images that are farthest from a downsized mean of the first plurality of low resolution images; and selecting the low resolution image having high frequency components larger than another low resolution image in the second plurality of low resolution images as the reference polyphase component.

5. The method of claim 4, further comprising:

estimating the enhanced resolution image a plurality of times based on the selected reference polyphase component, the plurality of times ranging between 2 and $J^2$; and determining a final version of the enhanced resolution image based on a smoothness thereof.

6. The method of claim 5, further comprising at least one of:

denoising, through the processor, the first plurality of low resolution images and the second plurality of low resolution images prior to estimating the sub-polyphase component of the each of the plurality of primary polyphase components and the expansion coefficients thereof; and denoising, through the processor, the final version of the enhanced resolution image to enhance a quality thereof.

7. The method of claim 6, wherein denoising the first plurality of low resolution images and the second plurality of low resolution images includes:

downsampling the first plurality of low resolution images and the second plurality of low resolution images by J×J and I×I respectively;

estimating a mean and a covariance of sub-low resolution images obtained through the downsampling; and denoising the first plurality of low resolution images and the second plurality of low resolution images through PCA based on the estimated covariance.

8. The method of claim 6, wherein denoising the final version of the enhanced resolution image to enhance the quality thereof is based on TV denoising.

9. The method of claim 6, further comprising:

sharpening the final version of the enhanced resolution image through UM; and removing irregularities in pixel intensity levels through a median filter.

10. An image processing system comprising:

a first sensor to capture a first plurality of low resolution images;

a second sensor to capture a second plurality of low resolution images, the first sensor having a higher resolution than the second sensor;

a processor to estimate expansion coefficients of polyphase components of an enhanced resolution image based on the second plurality of low resolution images captured through the second sensor, the expansion coefficients being expressed in terms of the first plurality of low resolution images captured through the first sensor, and the polyphase components of the enhanced resolution image being shifted and downsampled versions thereof;

wherein the processor is configured to estimate the expansion coefficients of the polyphase components of the enhanced resolution image through:

selecting a low resolution image of the second plurality of low resolution images as a reference polyphase component of the enhanced resolution image to be determined, the reference polyphase component being a shifted and a J×J downsampled version of the enhanced resolution image;

estimating a sub-polyphase component of each of a plurality of primary polyphase components of the enhanced resolution image, the primary polyphase components being shifted and I×I downsampled versions of the enhanced resolution image, I and J being integers, J>I>1, and the sub-polyphase component being a shifted and an J×J downsampled version of the corresponding each of the plurality of primary polyphase components of the enhanced resolution image;

estimating expansion coefficients of the each of the plurality of the primary polyphase components of the enhanced resolution image based on the estimated sub-polyphase component thereof to determine the enhanced resolution image, the expansion coefficients enabling the each of the plurality of the primary polyphase components to be expressed as a linear combination of the first plurality of low resolution images;

wherein the processor is configured to select the reference polyphase component of the enhanced resolution image through:
avoiding low resolution images from the second plurality of low resolution images that are farthest from a downsized mean of the first plurality of low resolution images;
selecting the low resolution image having high frequency components larger than another low resolution image in the second plurality of low resolution images as the reference polyphase component;
wherein the processor is further configured to:
estimate the enhanced resolution image a plurality of times based on the selected reference polyphase component, the plurality of times ranging between 2 and $J^2$;
determine a final version of the enhanced resolution image based on a smoothness thereof;
wherein the processor is further configured to at least one of:
denoise the first plurality of low resolution images and the second plurality of low resolution images prior to estimating the sub-polyphase component of the each of the plurality of primary polyphase components and the expansion coefficients thereof;
denoise the final version of the enhanced resolution image to enhance a quality thereof;
wherein the processor is configured to denoise the first plurality of low resolution images and the second plurality of low resolution images through:
downsampling the first plurality of low resolution images and the second plurality of low resolution images by J×J and I×I respectively;
estimating a mean and a covariance of sub-low resolution images obtained through the downsampling;
denoising the first plurality of low resolution images and the second plurality of low resolution images through PCA based on the estimated covariance;
wherein the processor is configured to denoise the final version of the enhanced resolution image based on TV denoising,
wherein the processor is further configured to:
sharpen the final version of the enhanced resolution image through UM;
remove irregularities in pixel intensity levels through a median filter;
a memory associated with the processor, the memory comprising storage locations configured to be addressable through the processor,
wherein the first sensor and the second sensor are associated with one of a same image processing device and a corresponding first image processing device and a second image processing device;
wherein a resolution of the enhanced resolution image is I times that of the first sensor and J times that of the second sensor, and
wherein the sub-polyphase component of the each of the plurality of primary polyphase components of the enhanced resolution image is also a sub-polyphase component of the reference polyphase component of the enhanced resolution image corresponding to a shifted and a I×I downsampled version thereof.

* * * * *